United States Patent

[11] 3,601,110

| [72] | Inventor | Isezi Kamazuka<br>Kariya-shi, Japan |
|---|---|---|
| [21] | Appl. No. | 2,091 |
| [22] | Filed | Jan. 12, 1970 |
| [45] | Patented | Aug. 24, 1971 |
| [73] | Assignee | Nippondenso Kabushiki Kaisha<br>Aichi-ken, Japan |
| [32] | Priority | Jan. 24, 1969, Jan. 30, 1969 |
| [33] | | Japan |
| [31] | | 44/5,397 and 44/6,940 |

[54] FUEL INJECTION SYSTEM
3 Claims, 2 Drawing Figs.

[52] U.S. Cl. .................................................. 123/179 L,
123/32, 123/122, 239/135
[51] Int. Cl. .................................................. F02b 3/00,
F02n 17/00, F02m 31/00
[50] Field of Search.......................................... 123/179 L,
32 CL, 122 E, 122 F; 239/135, 133

[56] References Cited
UNITED STATES PATENTS

| 2,679,837 | 6/1954 | Tyler | 123/179 |
|---|---|---|---|
| 2,846,995 | 8/1958 | Foltz | 123/179 |
| 3,034,726 | 5/1962 | Peras | 239/133 |
| 3,408,007 | 10/1968 | Raichle et al. | 1/138 |
| 3,498,279 | 3/1970 | Seeley | 123/122 |

*Primary Examiner*—Mark M. Newman
*Assistant Examiner*—Ronald B. Cox
*Attorney*—Cushman, Darby & Cushman

ABSTRACT: A fuel injection system for an internal combustion engine provided with solenoid injection valves wherein in order to ensure a positive starting of the engine in cold weather, high frequency heating means are provided for heating the injection valves such that when the engine is at a low temperature, a high frequency generator for said heating means automatically operates to heat the injection valves.

INVENTOR
ISEZI KAMAZ

BY *Cushman, Darby & Cushman*
ATTORNEYS

3,601,110

FUEL INJECTION SYSTEM

BACKGROUND OF THE INVENTION

1. Field of the Invention

The present invention relates to a fuel injection system for internal combustion engines and more particularly to a fuel injection system wherein the quantity of fuel supplied to an internal combustion engine is properly controlled electrically.

2. Description of the Prior Art

In systems of this kind known to the prior art, a pulse synchronized with the valve open timing of an engine air inlet valve and a signal representing the engine suction as well as the temperature of the cooling water, atmospheric temperature of the cooling water, atmospheric temperature and pressure or the like converted into an electrical quantity, are applied to an injection pulse generator where these pulses are converted into fuel injection pulses having a pulse width corresponding to the engine suction as well as the temperature or the like, whereby these injection pulses are, after amplification, applied to solenoid valves disposed in the vicinity of the inlet valves for the engine cylinders to energize any desired solenoid valve at the instant to ensure that an adequate amount of fuel is injected. Moreover, the starting or running of an engine has been at least made possible by increasing the fuel supply so that air-fuel ratios ranging from three to four times that required for normal running may be provided for cold starting, idling in cold weather, or cold operation. However, these prior art systems are open to an objection that fuel consumption will be very high in cold weather and this is undesirable from the aspect of exhausting cleaner exhaust gases.

SUMMARY OF THE INVENTION

In order to eliminate these drawbacks, the object of the present invention is to provide, in combination, a high-frequency generator to produce a high-frequency output inversely proportional to the temperature of an engine and heating means provided for solenoid valves and adapted to be actuated by the output from said generator, whereby if the engine is cold such as during cold starting, the solenoid valves are preliminarily heated so that evaporation of the fuel is facilitated to ensure positive starting of the engine with a resultant decrease in fuel consumption and the exhaustion of cleaner exhaust gases.

To this end, therefore, the present invention provides a fuel injection system wherein a pulse is produced in accordance with the valve-open timing of the air inlet valves for an internal combustion engine and said pulse is then changed into a fuel injection pulse whose pulse width corresponds to the engine suction and the like thereby energizing fuel injection solenoid valves by means of said fuel injection pulse to inject the fuel into the engine cylinders, said system characterized by comprising a temperature detector to produce an electrical signal proportional to the engine temperature, a high-frequency generator to produce a high-frequency output depending on the output from said temperature detector, and heating means for each of said solenoid valves, said heating means being adapted to be actuated by the output from said high-frequency generator to heat said solenoid valves.

Various features and effects of the present invention will be apparent from the following description of an embodiment of the invention made with reference to the accompanying drawings.

DESCRIPTION OF THE PREFERRED EMBODIMENT

Figure 1:
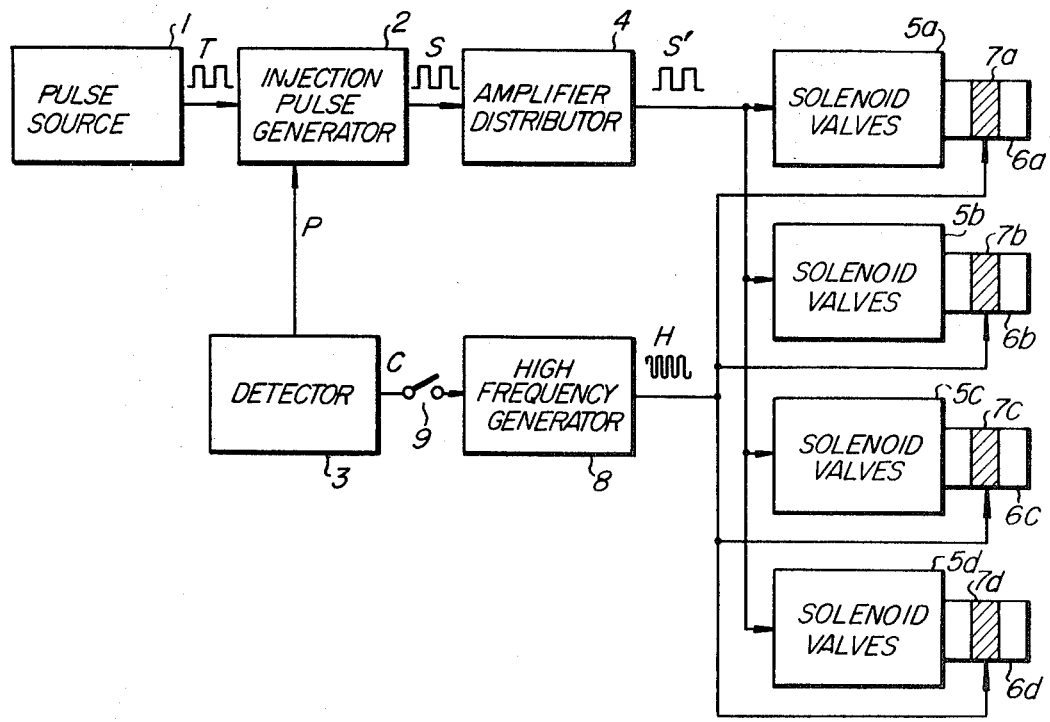
FIG. 1 is a block diagram showing an embodiment of the fuel injection system according to the present invention.
Figure 2:
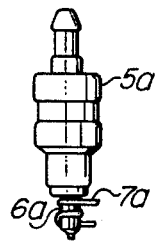
FIG. 2 is a schematic perspective view of the solenoid valve used with the system of the present invention showing the valve body with a high-frequency heating coil wound thereon.

The present invention will now be explained hereinafter in conjunction with the illustrated embodiment. Referring to FIGS. 1 and 2, numeral 1 designates a pulse source to produce a pulse T in accordance with the valve open timing of an inlet valve for the respective cylinders of a four-cylinder internal combustion engine (not shown); 2 an injection pulse generator; 3 a detector to convert the engine suction, atmospheric temperature and pressure, or the like into an electrical signal, the pulse T generated by the pulse source 1 and the signal P derived from the detector being applied to the injection pulse generator 2 where the pulse T is converted into a fuel injection pulse S whose pulse width (duration) varies in response to the engine suction, atmospheric temperature and pressure, or the like. Numeral 4 designates an amplifier distributor to amplify and distribute the fuel injection pulse S to solenoid vales 5a, 5b, 5c and 5d which are disposed in the vicinity of the associated inlet valves for the respective engine cylinders. Valve bodies 6a, 6b, 6c and 6d of the solenoid valves 5a through 5d are provided with high-frequency heating coils 7a, 7b, 7c and 7d, respectively wound around the outer periphery thereof. Numeral 8 designates a high-frequency generator whose oscillations are controlled by the signal from the detector 3 which corresponds to the engine temperature, the output of the generator being supplied to the high-frequency heating coils 7a, 7b, 7c and 7d, respectively. The output signal C from the detector 3 attains a value which causes the high-frequency generator to oscillate only when the engine temperature is below a predetermined value, while the value of signal C becomes sufficient to stop the oscillations of the high-frequency generator 8 when the engine temperature exceeds a predetermined value. Numeral 9 designates a switch inserted between the detector 3 and the high-frequency generator 8.

With the arrangement described above, the operation of the system according to the present invention will be explained hereunder.

As a power source switch (not shown) for the system of the present invention is closed prior to starting an internal combustion engine, signal C which is proportional to the engine temperature is produced in the detector 3. Then, if the engine is at a very low temperature such as in cold weather and starting of the engine is thus assumed to involve difficulties, closing the switch 9 causes the output C from the detector 3 to be applied to the high-frequency generator 8 via the switch 9, and then the generator 8 oscillates to supply it high frequency output H to the high-frequency heating coils 7a, 7b, 7c and 7d.

When this happens, the valve bodies 6a through 6d of the solenoid valves 5a through 5d are heated by means of electromagnetic induction. In this situation, as the engine is started, pulse T is provided from the pulse source 1 and simultaneously the detector 3 generates signal P corresponding to the engine suction, the temperatures at various parts of the engine, atmospheric pressure, or the like. These pulse T and signal P are then supplied to the injection pulse generator 2 where fuel injection pulse S is produced having a pulse width as determined by the signal P. This pulse S is amplified by the amplifier distributor 4 and it is then applied to the corresponding one of the solenoid valves such as the solenoid valve 5a to energize it. The solenoid valve 5a stays open for a time period corresponding to the pulse width of pulse S' which is applied thereto and it closes after having injected a proper amount of fuel. The remaining solenoid valves 5b, 5c and 5d may be opened and closed in a similar manner as with the solenoid valve 5a. In this case, since the valve bodies 6a through 6d of the solenoid valves 5a through 5d have been heated as previously stated, the fuel delivered through them will be completely evaporated before it is actually supplied to the cylinders. This ensures that starting of the engine in cold weather can be effected quite smoothly without increasing the amount of fuel to be delivered. Then, as the temperature of the engine thus started rises and eventually exceeds a predetermined value, the high-frequency generator 8 stops its oscillations so that the valve bodies 6a, 6b, 6c and 6d will not be heated unnecessarily. In other words, the system according to the present invention is designed such that the evaporation of fuel will be facilitated only for starting the engine to thereby ensure smooth starting of the engine.

Moreover, resistance wires may be utilized in place of the high-frequency heating coils 7a through 7d so that heating by such resistance wires can be employed.

In the embodiment described above, while the high-frequency generator 8 is designed to oscillate and provide its output for heating purpose only when the signal from the detector 3 is less (or more) than a predetermined level, it is also possible to design it such that the oscillation frequency or output of the high-frequency generator 8 may be controlled in inverse proportion to the engine temperature by means of the signal from the detector 3. In this way, if the engine is cold when it is to be started, the high frequency generator 8 will produce a high-frequency or high-voltage output to heat the valve bodies 6a, 6b, 6c and 6d. After the starting of the engine, however, as the temperature at various parts of the engine approach normal temperatures, the frequency or output voltage of the high-frequency generator 8 gradually decreases until its output becomes zero within the normal temperature range thus preventing the valve bodies 6a, 6b, 6c and 6d from being heated unnecessarily.

While the present invention is explained as incorporated in a four-cylinder engine in the embodiment described above, it may be equally embodied in other multiple-cylinder engines or single cylinder engines. In the case of single cylinder engines, the distributing function of the amplifier distributor 4 will not be required.

I claim:

1. In a fuel injection system wherein an electrical pulse is produced in accordance with the valve-open timing of the air inlet valves for an internal combustion engine and the pulse is then converted into a fuel injection pulse whose pulse width corresponds to the engine suction and the like thereby energizing fuel injection solenoid valves by means of the fuel injection pulse to inject the fuel into the engine cylinders, the combination characterized by comprising a temperature detector to produce an electrical signal proportional to the engine temperature, a high-frequency generator to produce a high-frequency output depending on the output from said temperature detector, and heating means provided for each of said solenoid valves, said heating means being adapted to be actuated by the output from said high-frequency generator to heat said solenoid valves.

2. A fuel injection system according to claim 1 wherein said high-frequency generator is so constructed that said generator produces a high-frequency output only when the output from said temperature detector is at a value corresponding to the temperature below a predetermined level.

3. A fuel injection system according to claim 1 wherein said high-frequency generator is so constructed that said generator produces a high-frequency output substantially inversely proportioned to the engine temperature represented by the output of said temperature detector.